(12) United States Patent
Harris (10) Patent No.: US 8,171,286 B2
(45) Date of Patent: *May 1, 2012

(54) COMPUTER PROGRAM FOR SECURELY VIEWING A FILE

(76) Inventor: Steven M. Harris, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/900,799

(22) Filed: Oct. 8, 2010

(65) Prior Publication Data

US 2011/0030052 A1  Feb. 3, 2011

Related U.S. Application Data

(62) Division of application No. 10/797,216, filed on Mar. 10, 2004, now Pat. No. 7,836,301.

(51) Int. Cl.
*G06F 21/00* (2006.01)
(52) U.S. Cl. ........ 713/165; 713/164; 713/189; 713/193; 726/26; 726/27
(58) Field of Classification Search .................. None
See application file for complete search history.

(56) References Cited

U.S. PATENT DOCUMENTS

| | | | | |
|---|---|---|---|---|
| 6,957,199 B1 * | 10/2005 | Fisher | ............................. | 705/78 |
| 7,356,705 B2 * | 4/2008 | Ting | ............................. | 713/186 |
| 7,406,596 B2 * | 7/2008 | Tararukhina et al. | ......... | 713/165 |
| 2010/0251346 A1 * | 9/2010 | Dumais | ............................. | 726/5 |

OTHER PUBLICATIONS

Scott Dunn, "Windows Tips: Password-Protect Your Sensitive Files and Folders", 3 pages, published: May 28, 2003.*
Dan Griffin, "Safer Authentication with a One-Time Password Solution", published May 2008.*
unknown author, "IIJA Document Exchange Service", published 2009.*
unknown author, "Keychains.cpp", copyright 2002-2004.*
Scott Dunn, "Windows Tips: Password-Protect Your Sensitive Files and Folders", published May 2003.*
U.S. Appl. No. 11/174,112.*

* cited by examiner

*Primary Examiner* — Ponnoreay Pich
(74) *Attorney, Agent, or Firm* — Dunlap Codding, P.C.

(57) ABSTRACT

A method for distributing a password protected content file without revealing the password to a recipient. An unlocking program that has access to at least one password corresponding to the password protecting the password protected content file is distributed to the recipient's computer. The password protected content file is distributed to the recipient's computer wherein upon activation of the unlocking program, the unlocking program automatically supplies the at least one password upon loading of the password protected content file.

14 Claims, 5 Drawing Sheets

COMPUTER PROGRAM FOR SECURELY VIEWING A FILE

CROSS-REFERENCE TO RELATED APPLICATIONS

The present application is a Divisional of U.S. Ser. No. 10/797,216, filed Mar. 10, 2004, now U.S. Pat. No. 7,836,301 the contents of which are hereby incorporated by reference in its entirety.

BACKGROUND OF THE INVENTION

Methods for distributing password-protected content files are well known. Common example of such content files are .pdf files, Microsoft Word files, text files, WordPerfect files, or the like. Such files are commonly distributed by way of communication medians, such as the Internet. Such content files are commonly posted onto web sites where such content files can be downloaded by users. In certain instances, money is charged for the ability to download the content files, and in other instances such downloading is permitted for free.

In certain instances, such content files are protected by more than one password. For example, .pdf files commonly have two passwords: a user password, and an owner password. If a party knows the owner password, then such party can print the content file, save the content file under another name, or in general have all rights of the content owners. For this reason, many content owners will specify a user password which upon use provides the user with much less rights with respect to such file. Common user privileges would be only to view such content file. The user would typically not have the ability to print, make copies, or to distribute such content file.

There are two common manners to avoid the protection of the .pdf file. The first manner to avoid the protection accorded the .pdf file is to "capture" the screen to the computer's clipboard. Each captured screen is then saved as a separate file and then the separate files are then consolidated into a single file. The second manner is to use a password cracker program. For .pdf files, a product entitled "Advanced PDF Password Recovery" is available from ElComSoft Proactive Software. Elcomsoft's software requires the recipient of the content file to enter the "user" password. Under normal circumstances a distributor of a password protected PDF file, must disclose the user or "open" password to the user so they can open and view the file. By doing so they expose the "Owner" password to attack by ElComsoft's password cracker. Elcomsoft's program will "not" work if the user and owner passwords are unknown.

Thus, a need exists to distribute a password protected content file without revealing a password to the recipient or user. It is to such a system and method that the present invention is directed. With respect to PDF files, an attribute of the present invention is that the recipient or user cannot learn either the user or the owner password. Thus, the recipient or user cannot use Elcomsoft's program to attack the owner password.

SUMMARY OF THE INVENTION

In general, the present invention is directed to a method for distributing a password-protected content file without revealing the password to a recipient. Initially, an unlocking program is distributed to the recipient's computer. The unlocking program has access to at least one password corresponding to the password protecting the content file. For example, the password corresponding to the password protecting the content file can be embedded in the unlocking program, or the unlocking program can be provided with an address containing the location of the password. In either event, the password-protected content file is then distributed to the recipient's computer wherein upon activation of the content file, the unlocking program automatically supplies the at least one password upon loading of the password-protected content file.

In one preferred embodiment, the content file is readable by an application program. For example, the application program can be Adobe Acrobat, Adobe Reader, Microsoft Word, WordPerfect, or the like. In general, the application program is a computer program that performs one or more of the tasks for which a computer is used. When the content file is readable by the application program, the at least one password is preferably supplied to the application program upon the application program loading the content file. In one preferred embodiment, the unlocking program is adapted to run separately from the application program and to monitor the application program for a request for a password. It should also be understood that the unlocking program can run as a part of the application program. For example, the unlocking program can be designed as a program commonly referred to as a "plug-in".

The unlocking program and the content file can be distributed separately to the recipient's computer, or can be distributed simultaneously to the recipient's computer. For example, the content file and the unlocking file can be compiled into a self-executing file. In this example, the self-executing file would then be distributed to the recipient's computer. After receiving the self-executing file, the recipient's computer would initiate such self-executing file to unpack the content file and the unlocking program.

DETAILED DESCRIPTION OF THE INVENTION

Figure 1:
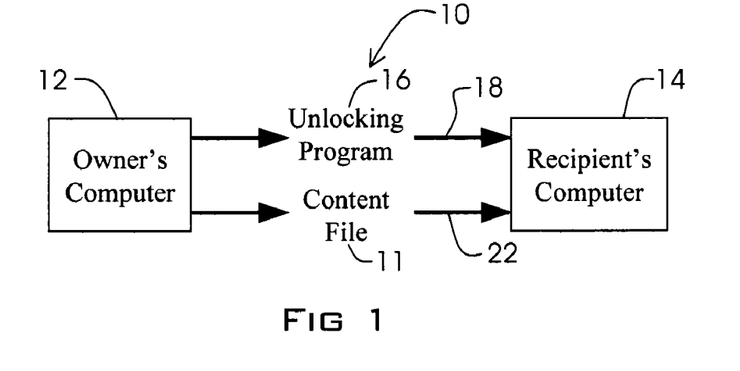
FIG. 1 is a schematic view of a method for distributing a password-protected content file in accordance with the present invention.

Referring now to the drawings, and in particular to FIG. 1, shown therein and designated by a reference 10 is a system for distributing a password-protected content file 11 (hereinafter referred to as "content file") without revealing the password to a recipient or user. The terms "recipient" or "user" are used interchangeably herein and generally refer to any person who has access to the content file 11. The system 10 is provided with one or more owner's computer 12, and one or more recipient's computer 14. The owner's computer 12 distributes an unlocking program 16 (see FIG. 3) to the recipient's computer 14 via a signal path 18. The unlocking program 16 has access to at least one password 17 (FIG. 3) corresponding to the password protecting the content file 11. The content file 11 can contain any type of content perceivable by a recipient, or the recipient's computer 14. For example, the content file can include text, graphics, video, photographs, sound, machine code, or the like. The password 17, in general, includes one or more symbols required for access to the content file 11. In general, the password 17 can be any sequence of symbols, or characters which enables one to gain or pass admission to the content file 11. In certain circumstances, the password 17 may include biometric, video, unprintable character(s) (e.g., ascii 255) or other types of information not commonly used for passwords.

The owner's computer 12 also distributes the password-protected content file 11 to the recipient's computer 14 via a signal path 22. Upon activation, the unlocking program 16 automatically supplies the at least one password 17 upon loading of the content file 11 to permit access to the content file 11 without revealing the password 17 to the recipient.

The owner's computer 12 can be any type of computer capable of distributing the unlocking program 16, and the content file 11 to the recipient's computer 14. Common examples of the owner's computer 12 include Windows-based and Macintosh-based personal computers, servers associated with or running web sites, mainframes, mini computers, cell phones, PDAs, or the like. The owner's computer 12 can distribute the unlocking program 16 or the content file 11 via any suitable distribution medium. For example, the unlocking program 16, and/or the content file 11 can be distributed to the recipient's computer 14 by way of e-mail, file transfer protocol, or by simply permitting the recipient's computer 14 to download the unlocking program 16, or the content file 11.

The signal paths 18 and 22 can be any suitable communication link which permits electronic communications, such as extra computer communications systems, intra-computer communications systems, internal buses, local-area networks, wide-area networks, point-to-point shared and dedicated communications, infrared links, microwave links, telephone links, cable TV links, satellite links, radio links, fiber-optic links, cable links and/or any other suitable communication system. It should be understood that signal paths 18 and 22 are shown and described separately herein for the sole purpose of clearly illustrating the information being communicated between the various components. The signal paths 18 and 22 may not be separate communication links but may be a single physical communication link. In one preferred embodiment, the signal paths 18 and 22 are part of a global network commonly referred to as the "Internet".

The recipient's computer 14 can be any type of computer system capable of receiving the unlocking program 16, and the content file 11. Preferably, the recipient's computer 14 is also capable of running the unlocking program 16 to permit access to the content file 11. However, it should be understood that in certain instances the recipient's computer 14 may also serve a similar function as the owner's computer 12 after the unlocking program 16 and the content file 11 have been received. In this case, the recipient's computer 14 would serve as the owner's computer 12. In one preferred embodiment, the recipient's computer 14 is also capable of running the unlocking program 16 such that the unlocking program 16 continuously monitors the system functions of the recipient's computer 14.

For example, in one preferred embodiment, upon attempting to load the content file 11, the unlocking program 16 detects such loading and thereafter supplies the password 17 (FIG. 3) to permit access to the content file 11 without revealing the password 17 to the recipient.

It should also be understood that only one of the recipient's computer 14 is shown in FIG. 1 for purposes of clarity. It is envisioned that more than one recipient's computer 14 will exist in the system 10. It is also envisioned that a large number of recipient computer's 14 will be provided in the system 10 such that a wide distribution of the content file 11 and the unlocking program 16 is accomplished. Common examples of the recipient's computer 14 are personal computers (e.g., Windows-based, or Macintosh-based), mainframes, mini computers, cell phones, PDAs, or the like.

In one preferred embodiment, the content file 11 is readable by an application program (not shown). For example, the application program can be Adobe Acrobat, Adobe Reader, Microsoft Word, WordPerfect, or the like. In general, the application program is a computer program that performs one or more of the tasks for which a computer is used. In this embodiment, the unlocking program 16 supplies the at least one password 17 to the application program upon the application program loading the content file 11. In general, upon the application program loading the content file 11, the application program will determine if the content file 11 requires a password. Because the content file 11 requires the password 17, the application program prompts the recipient to enter the required password to view the content file 11. The unlocking program 16 monitors the application program to see whether a prompt window has appeared asking for the password 17. If the window appears, the unlocking program sends the password 17 to the window, and triggers the "OK" button and the content file 11 is then loaded. The content within the content file can then be perceived by the recipient. For example, when the content file is a .pdf file the content is displayed; when the content file is a .wav file the content is played.

It should be noted that throughout this process when the unlocking program 16 is being run on a Windows operating system, the unlocking program 16 is preferably sending data to the Windows clipboard constantly. Each time data is sent to the clipboard, the prior contents of the clipboard are destroyed-replaced by the new data. If the recipient attempted to perform a screen capture of the visual image of the screen, that data is sent to the clipboard-however-once this occurs, the unlocking program 16 quickly sends new data to the clipboard which destroys the screen capture data replacing it with useless data. When the recipient attempts to "paste" the screen capture into another document (to preserve what he saw on screen) the "paste" of the screen contents is not what he sent to the clipboard but rather a message sent by the unlocking program that says for example "clipboard disabled" because the screen capture data was replaced by new data.

In one preferred embodiment, the unlocking program 16 is adapted to run separately from the application program and to monitor the application program for a request for the password 17. Alternatively, the unlocking program could be incorporated into the application program, as a "plug-in" or otherwise.

Figure 2:
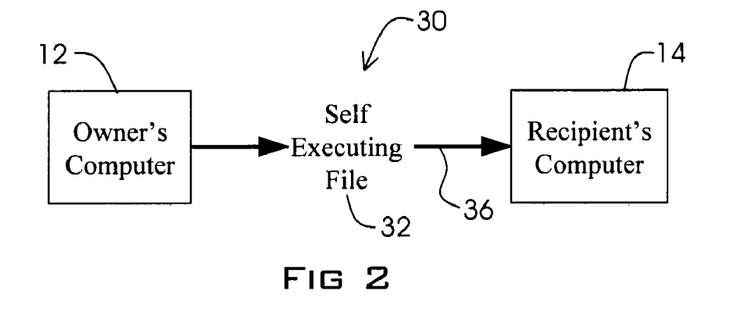
FIG. 2 is a schematic view of another embodiment of a method for distributing the password-protected content file in accordance with the present invention.
Figure 3:
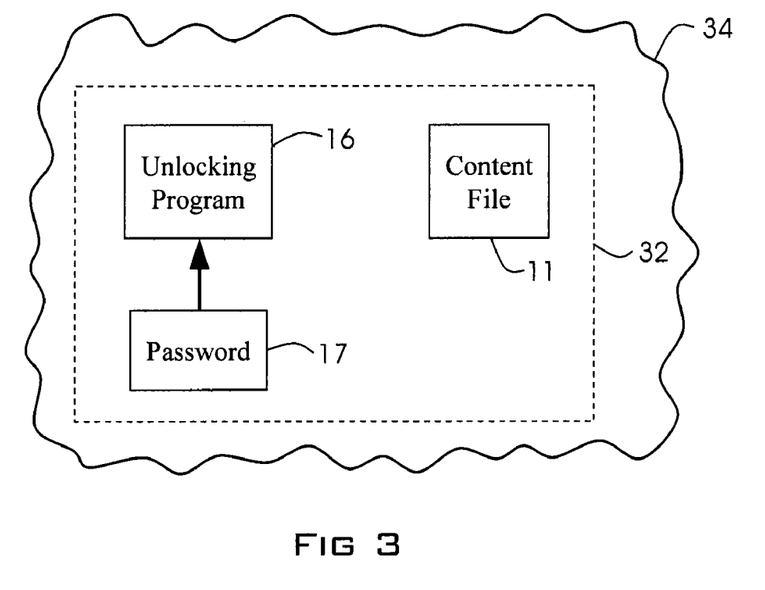
FIG. 3 is a schematic view of a self-executing file stored on a computer readable medium, the self-executing file constructed in accordance with the present invention for permitting a recipient to use the content file without revealing the password to the recipient.

Referring now to FIG. 2, shown therein and designated by a reference numeral 30 is another embodiment of a system for distributing the password-protected content file 11 to the recipient's computer 14 without revealing the password at 17 (FIG. 3) to the recipient. In this embodiment, a self-executing file 32 is distributed to the recipient's computer 14 from the owner's computer 12. The self-executing file 32 is stored on a computer readable medium 34 (FIG. 3). The computer readable medium 34 is any type of device, substrate or system capable of storing the logic constituting the self-executing file 32 and presenting such logic in a format readable by a computer, such as the owner's computer 12 or the recipient's computer 14. Common examples of computer readable mediums include hard disks, optical disks, floppy disks, tapes, memory, or the like. In the embodiment depicted in FIG. 2, the owner's computer 12 includes the computer readable medium 34 storing the self-executing file 32. The self-executing file 32 is transmitted via a signal path 36 to the recipient's computer 14. The signal path 36 is similar to the signal paths 18, and 22 discussed above. In all likelihood, the signal path 36 includes a variety of intermediary devices, such as gateways, or routers which also include computer readable mediums 34 to store the self executing file 32 while the self executing file 32 is being transmitted or distributed. Once the self executing file 32 is received by the recipient's computer 14, the recipient's computer 14 stores the self executing file 32 onto the computer readable medium 34, which in all likelihood is a memory, hard disk, or network disk located at or accessed by the recipient's computer 14.

A diagrammatic illustration of the self-executing file 32 is shown in FIG. 3. The self-executing file 32 includes the unlocking program 16, one or more content file 11, and the password 17. The unlocking program 16, content file 11, and password 17 have already been described above. Thus, no further comments regarding the construction of the unlocking program 16, password 17, or content file 11 is deemed necessary to teach one skilled in the art how to make or use the present invention.

It should be understood that one skilled in the art will recognize how to compile the unlocking program 16, password 17, and content file 11 into a self executing file. For example, software provided with a product known as "WinBatch" obtainable from Wilson WindowWare, Inc. located in Seattle Wash. includes the compilers or other logic necessary to incorporate the unlocking program 16, password 17 and content file 11 into the self-executing file 32.

Figure 4A:
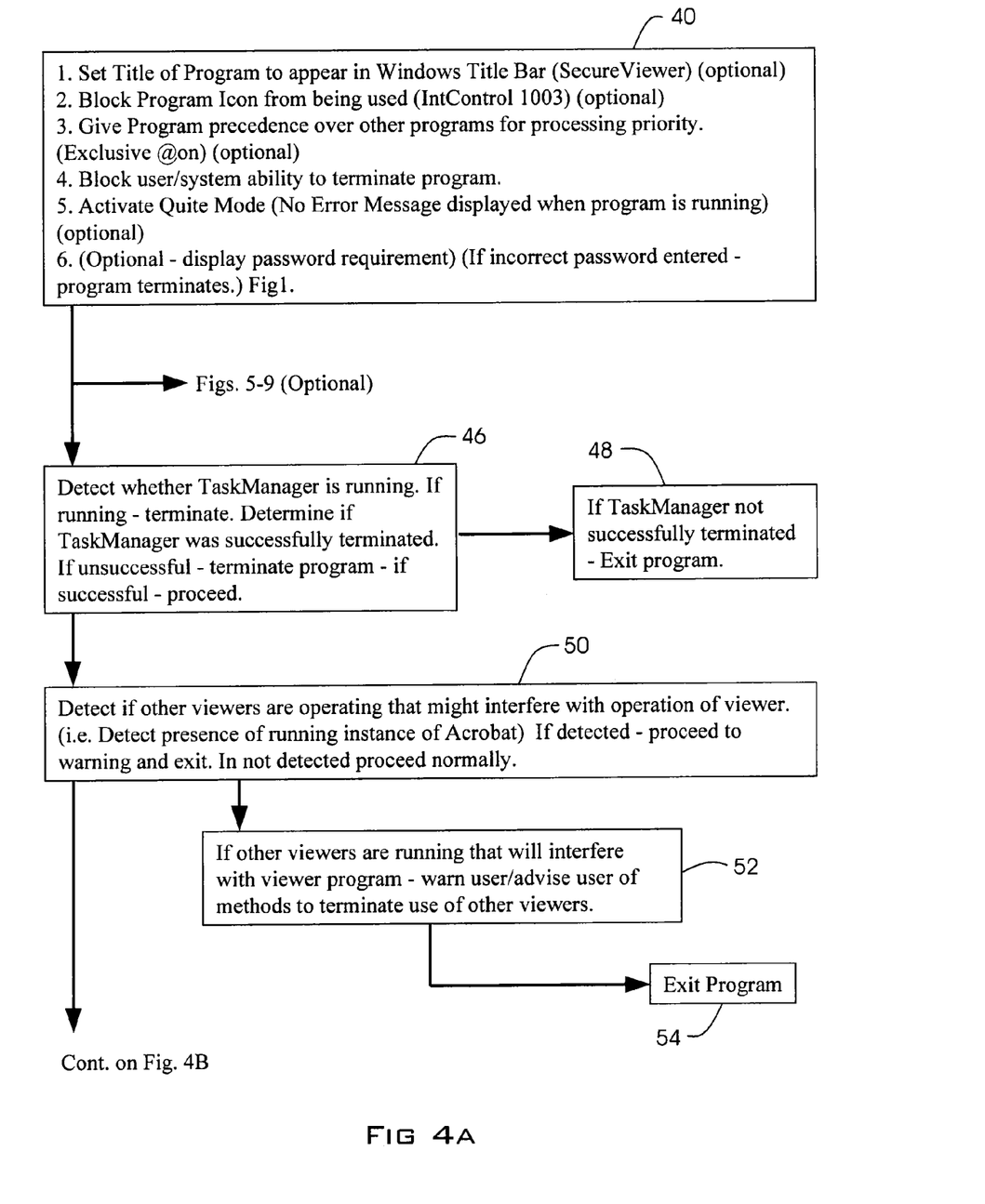
FIG. 4 is a schematic diagram illustrating the logic followed by one embodiment of an unlocking program constructed in accordance with the present invention.
Figure 4B:
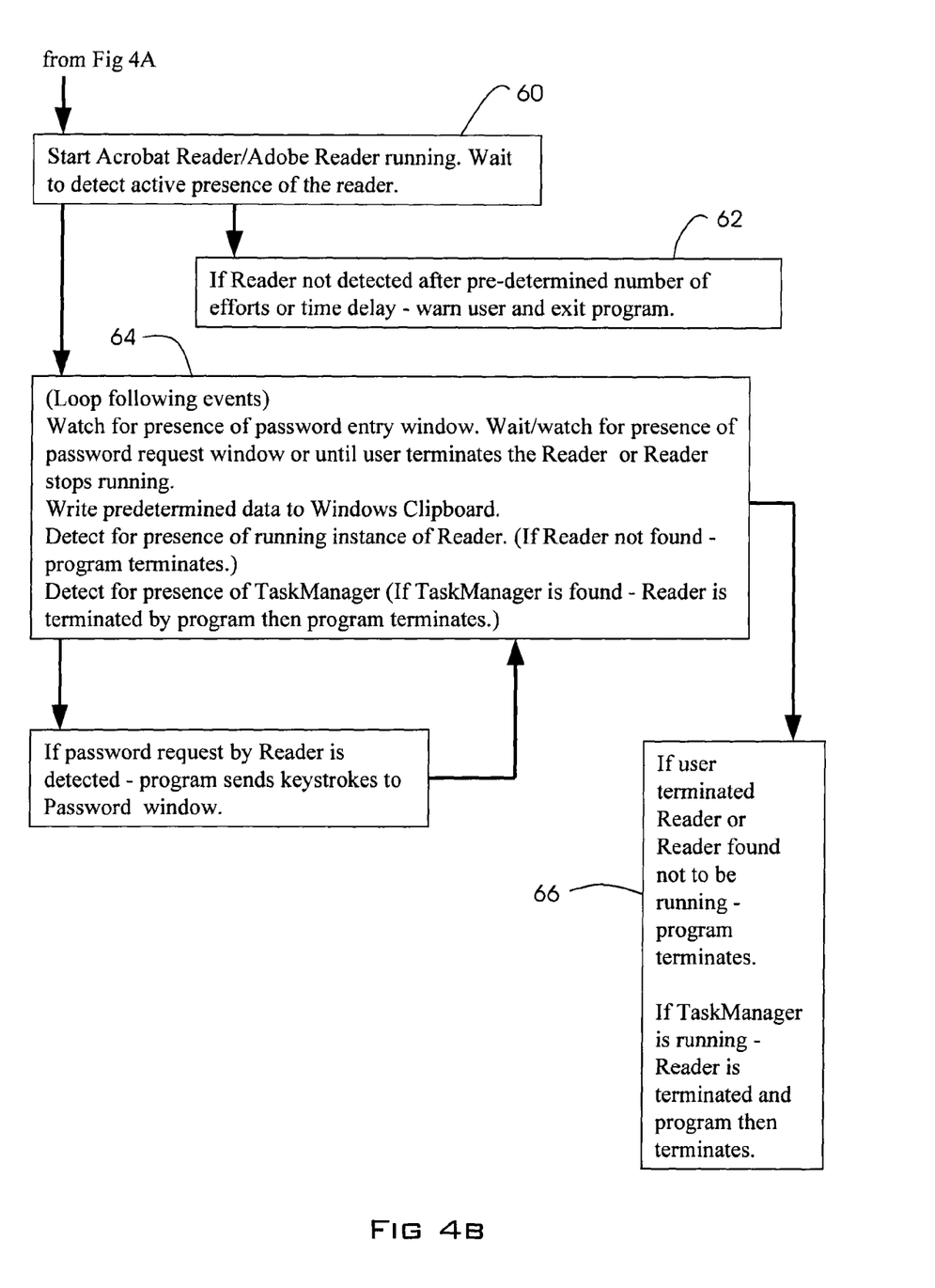

Shown in FIGS. 4a and 4b is a logic flow diagram illustrating one preferred embodiment of the unlocking program 16. The logic depicted in FIGS. 4a and 4b will be described herein with reference to the WinBatch programming language. However, it should be understood that the basic logic depicted in FIGS. 4a and 4b could be implemented in other programming languages, such as Java or C++.

It should be understood that the following description will include many steps which are considered to be optional to the embodiment depicted in FIGS. 4a and 4b, and many steps which are considered to be "required" to the embodiment depicted in FIGS. 4a and 4b. The steps which are considered to be "optional", or "required" may not in fact be "optional", or "required", depending on the operating system of the computer running the unlocking program, or the particular application involved.

For example, the unlocking program 16 initially branches to a step 40 to conduct the initialization of the computer upon which the unlocking program 16 is running. In the step 40, the unlocking program optionally sets the title of the program to appear in a Windows title bar, optionally blocks a program icon from being used, optionally provides program precedence to the unlocking program 16 over other programs running on the computer for processing priority, blocks user/system ability to terminate the program ("required"), and optionally activates the quiet mode, as well as displays optional password requirements.

In one preferred embodiment, the unlocking program 16 disables "control-alt" as means to terminate, and in the WinBatch language such unlocking program 16 will initiate an IntControl 12 command. This is an example of the unlocking program 16 running on the Windows operating system. If the operating system does not include any manner for permitting the user/system the ability to terminate the unlocking program 16, then this step would not be utilized, even though it is indicated herein as "required".

The unlocking program 16 can 1) block the Program Icon from being used with the IntControl 1003 command, 2) give program precedence with the Exclusive@on command, 3) and block user/system ability to terminate program with the IntControl 012 command.

The unlocking program 16 branches to a step 46 to detect whether the system administrator program, such as a task manager program (hereinafter referred to as "the task manager program"), is running. If the task manager program is running then the unlocking program 16 terminates the task manager program. If the task manager program is not successfully terminated, the unlocking program 16 branches to a step 48 where the unlocking program 16 exits the program. If the task manager was not running, or was successfully terminated, the unlocking program 16 branches to a step 50 to detect whether other application program(s) are operating that might interfere with the operation of the application program utilized for reading the content file 11. If the other application program(s) are detected, then the unlocking program 16 branches to a step 52 where a warning is provided to the user to terminate the use of the other application programs. If the other application program(s) is not terminated, the unlocking program 16 branches to a step 54 and exits the unlocking program 16.

If an application program that might interfere with the operation of the application program opening the content file is not operating, the unlocking program 16 branches to a step 60. In the step 60, the unlocking program 16 executes the application program, and waits to detect the active presence of the application program. If the application program is not detected after a predetermined number of efforts, or time delay, the unlocking program 16 branches to a step 62. In the step 62, the unlocking program 16 warns the user and then exits the unlocking program 16.

If the application program was successfully started in step 60, the unlocking program 16 branches to a step 64 in which the unlocking program 16 executes the following steps in a looping, continuous manner. Optionally, the unlocking program 16 modifies the window title to display name of the issuer of the content file 11, and then watches for the presence of a password entry window. The unlocking program blocks the screen capture function of the application program by writing predetermined data to the Windows clipboard, and then monitors for the presence of running of the application program. If the application program stops running, the unlocking program 16 branches to a step 66 where the unlocking program 16 is terminated. Further, in the step 64 the unlocking program 16 detects the presence of the task manager program, and if the task manager program is found then the application program and the unlocking program 16 are terminated. If the password entry window is detected in the step 64, then the unlocking program 16 sends the password 17 to the password window. This step is desirably performed programmatically, for example, keystrokes can be sent to the password window such that the application program sees the keystrokes as if they had been typed by a human user. As discussed above, the unlocking program 16 merely has to have access to the password 17. The password 17 can be written into the unlocking program 16, or can be accessed by the unlocking program 16 and then sent or transmitted to the application program by the unlocking program 16.

Figure 5:
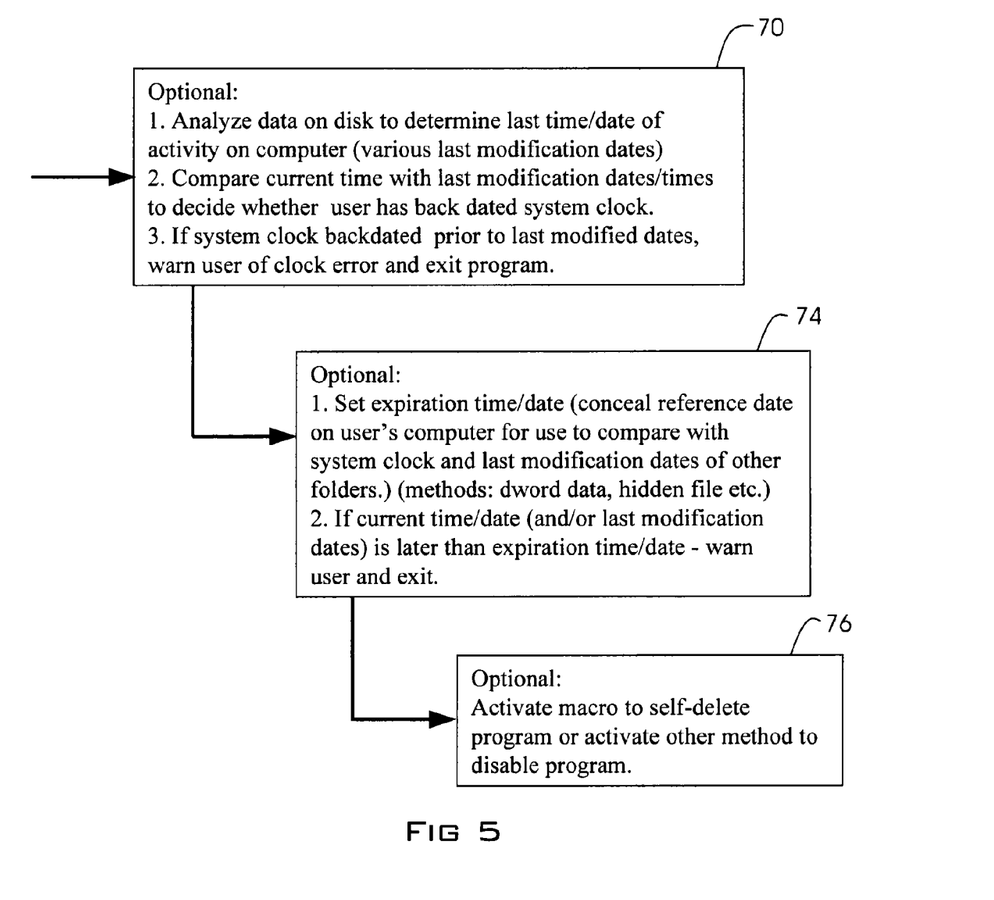
FIGS. 5-9 are schematic diagrams of a variety of optional programs which can be incorporated into or used in addition to certain logic depicted in FIG. 4.

As shown in FIG. 5, the unlocking program 16 can be optionally provided with an expiration time/date such that the unlocking program 16 becomes disabled after a predetermined period of time. In this embodiment, the steps of distributing the content file 11 and the unlocking program 16 can be automatically repeated at a predetermined rate to a list of one or more predetermined recipients where the password 17 is different in each repeat cycle. Thus, for example, an owner of a catalog (content) can distribute the catalog in a .pdf file (content file) to all of the owner's sales force (predetermined recipients) every month (predetermined rate). If one of the salespersons in the sales force is terminated or otherwise leaves, the sales person would be removed from the list of predetermined recipients. Thus, the sales person would not receive the next month's catalog and the terminated sales person's catalog would expire at the end of the current month.

In this embodiment, the unlocking program 16 first branches to a step 70 to determine whether the clock on the recipient's computer 14 running the unlocking program has been backdated. To accomplish this step, the unlocking program 16 analyzes the data on the hard disk to determine last time/date of activity on computer, (e.g., various last modification dates), and then compares the current time with the last modification dates to determine whether the recipient has back-dated the system clock. If the system clock has been backdated, the unlocking program 16 warns the user of a clock error and then exits the unlocking program 16.

If the clock has not been backdated, the unlocking program 16 branches to a step 74 where the unlocking program 16 sets an expiration time/date. In this step, the unlocking program 16 preferably conceals the reference date on the recipient's computer 14 by using methods referred to in the art as "dword data", "hidden file" or the like. The unlocking program 16 then reads the current time and compares the current time to the reference date. If current time/date is later than the reference date or an expiration date based on the reference date, the unlocking program 16 warns the recipient and then exits. As another optional feature, the unlocking program 16 can activate a macro to self-delete the unlocking program 16, as indicated by a step 76.

Figure 6:
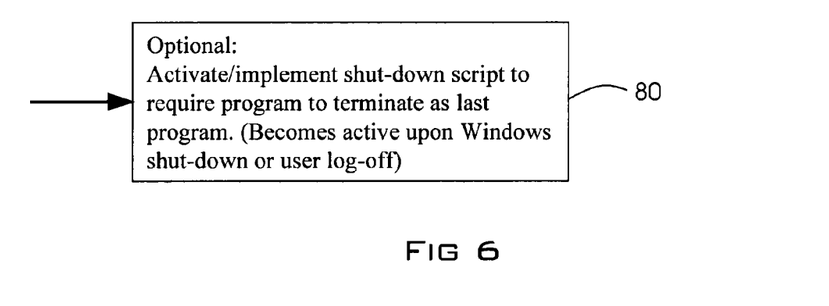

As shown in FIG. 6, another optional feature is to activate a "shut-down" script, as indicated by a step 80. The shut-down script would require the unlocking program 16 to terminate as the last program.

Figure 7:
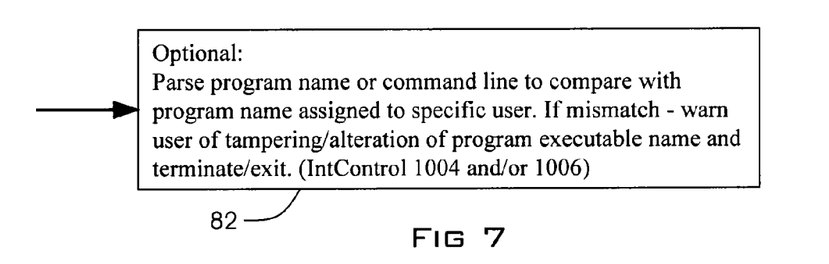

As shown in FIG. 7, another optional feature is to assign the unlocking program a password or an assignment to a particular user to prevent unauthorized access to the unlocking program, as indicated by a step 82.

Figure 8:
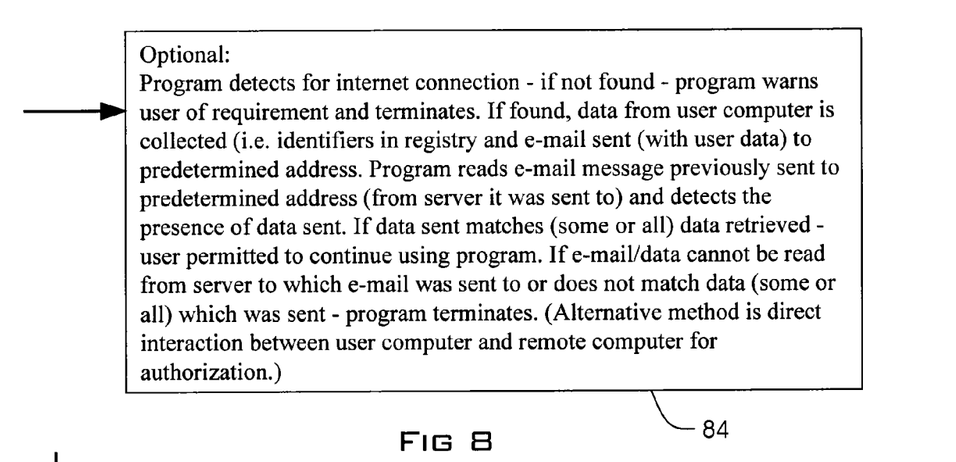

As shown in FIG. 8, the unlocking program 16 can also optionally communicate with a remote computer for authorization as indicated by a step 84. In this embodiment, the unlocking program 16 can send data identifying the recipient's computer 14 to the remote computer to obtain authorization.

Alternatively, other types of authorization can be provided by the remote computer. For example, another method would be for the recipient's computer 14 to access a website and log-in or the unlocking program 16 could perform this action automatically. The unlocking program 16 would be activated upon receipt of an authorization code passed to the unlocking program 16 from a program running on the website. Periodically the unlocking program 16 would require renewal of its authorization before it would function. If it did not receive the necessary authorization—then access would be denied.

Another method would be for the unlocking program 16 to cause the recipient's computer 14 to send an email including information regarding the recipient's computer 14 to a predetermined e-mail account, such as the owner's or distributor's email account. The email would preferably be sent using an e-mail account set up for the unlocking program 16 and not that of the recipient. In this example some form of internet access must be available. The unlocking program 16 would then access the email account for the destination computer to which it had just sent the email—and determine if the email that was sent was in fact received and contained information about the recipient's computer 14. There is literally no end to the kind and volume of data about the recipient's computer 14 on which the unlocking program 16 is running that can be sent in the email. Once it was confirmed that the email had been successfully received, the unlocking program 16 would then become fully functional. If unsuccessful in transmitting the email or required data within the email, the unlocking program 16 would abruptly terminate.

Provided that there is a communication link between the computer running the unlocking program (i.e., the recipient's computer 14) and the system operated by the distributor of the unlocking program 16, the unlocking program 16 could be terminated at any moment in operation by having the unlocking program constantly looking for an authorization code that must be present on a remote system—and if erased or not provided by the remote system—the unlocking program 16 would terminate. In one preferred embodiment, the unlocking program 16 would erase the needed authorization code with each verification of the code's existence, and then allow a period of time in which it must receive and identify another new authorization code. If not received after some pre-determined time period (1 minute, 1 hour, 1 day etc) then the unlocking program 16 would be rendered inoperable. This would allow a supervisor to terminate access to sensitive materials within a very short time period. When it failed to receive a new authorization code, the unlocking program 16 would terminate the viewing program (Adobe Reader), potentially erase/destroy (overwrite) all protected files, and then terminate or self-destruct.

Another possible example is for the user of the unlocking program 16 to be required to download a file which is read by the unlocking program for periodic re-authorization. Another more sneaky method, is to construct the unlocking program 16 to not only provide the needed password, but to automatically authorize the running of an executable embedded into the content file 11, such as a PDF file, which would run and hide new codes or other data (used for authorization). Normally Adobe Acrobat will prompt the user to determine if the user wants to allow an executable to run once it is activated (the activation process can occur/commence automatically by the activity of opening the .pdf file—which is in turn automatically activated when the unlocking program instructs Acrobat to open a file—or may occur when the user manually opens a PDF file. The unlocking program 16 would identify the warning message issued by Acrobat (this is to warn the user of the possibility that the executable may be a virus) and automatically activate the permission to run. The entire process would be almost instantaneous.

There are of course an endless variety of methods to hide authorization data inside of a PDF file (or any file)—which could be read in several different ways, including a certain sequence of binary data that must be present.

Figure 9:
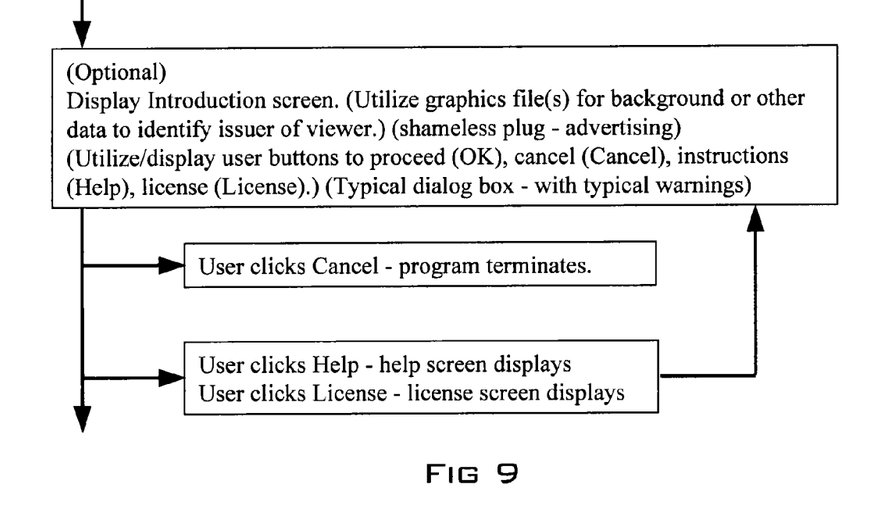

As shown in FIG. 9, the unlocking program 16 can also be provided with information identifying the owner or distributor of the content file 11. This would preferably be implemented by a display introduction screen.

One skilled in the art will recognize the advantages of the unlocking program 16 and the methods for distributing the content file 11 discussed herein. Changes may be made in the various elements, components, parts and assemblies described herein or in the steps or sequences of steps in the methods described herein without departing from the spirit and the scope of the invention as defined in the following claims.

What is claimed is:

1. A method comprising the steps of:
distributing a self-executing file stored on a non-transitory computer readable medium to a recipient, the self-executing file comprising:
a content file storing content, the content file being readable by an application program, the content file being locked with at least one password; and
an unlocking program having access to at least one password corresponding to the at least one password locking the content file, the unlocking program having instructions to automatically supply the at least one password to the application program upon the application program loading the content file such that the recipient cannot learn the password.

2. The method of claim 1, wherein the unlocking program includes at least one instruction for initiating the application program and for causing the application program to load the content file.

3. The method of claim 1, wherein the unlocking program is adapted to run separately from the application program and to monitor the application program for a request for a password.

4. The method of claim 1, wherein the unlocking program accesses the at least one password corresponding to the at least one password locking the content file repeatedly at a predetermined rate, and wherein the password protecting the content file and the password accessed by the unlocking program are different in each repeat cycle.

5. A self-executing file stored on a non-transitory computer readable medium, the self-executing file comprising:
a content file storing content, the content file being readable by an application program, the content file being locked with at least one password; and
an unlocking program having access to at least one password corresponding to the at least one password locking the content file, the unlocking program having instructions to automatically supply the at least one password to the application program upon the application program loading the content file such that the recipient cannot learn the password.

6. The self-executing file of claim 5, wherein the unlocking program includes at least one instruction for initiating the application program and for causing the application program to load the content file.

7. The self-executing file of claim 5, wherein the unlocking program includes at least one instruction for preventing a screen capture representing at least a portion of the content stored in the content file.

8. The self-executing file of claim 5, wherein the unlocking program is adapted to run independently of the application program.

9. The self-executing file of claim 5, wherein the unlocking program includes instructions for monitoring the running of at least one system administration program capable of terminating the unlocking program.

10. The self-executing file of claim 9, wherein the unlocking program includes instructions for automatically terminating the system administration program upon detecting the running of such system administration program.

11. The self-executing file of claim 9, wherein the unlocking program includes an instruction for terminating the application program upon detecting the running of such system administration program.

12. The self-executing file of claim 11, wherein the unlocking program includes an instruction for terminating the unlocking program after the application program has been terminated.

13. The self-executing file of claim 5, wherein the unlocking program includes an instruction to prevent termination of the unlocking program.

14. The self-executing file of claim 5, wherein the content file is characterized as a .pdf file.

* * * * *